US009796455B2

(12) United States Patent
Larsen

(10) Patent No.: US 9,796,455 B2
(45) Date of Patent: Oct. 24, 2017

(54) CUTTER DEVICE FOR MARINE SURVEY SYSTEM AND RELATED METHOD

(71) Applicant: SERCEL SA, Carquefou (FR)

(72) Inventor: Raymond Larsen, Laksevåg (NO)

(73) Assignee: SERCEL SA, Carquefou (FR)

( * ) Notice: Subject to any disclaimer, the term of this patent is extended or adjusted under 35 U.S.C. 154(b) by 15 days.

(21) Appl. No.: 14/784,483

(22) PCT Filed: Apr. 23, 2014

(86) PCT No.: PCT/EP2014/058280
§ 371 (c)(1),
(2) Date: Oct. 14, 2015

(87) PCT Pub. No.: WO2014/173979
PCT Pub. Date: Oct. 30, 2014

(65) Prior Publication Data
US 2016/0096595 A1 Apr. 7, 2016

Related U.S. Application Data

(60) Provisional application No. 61/815,751, filed on Apr. 25, 2013.

(51) Int. Cl.
*B63B 21/66* (2006.01)
*G01V 1/38* (2006.01)

(52) U.S. Cl.
CPC ............ *B63B 21/66* (2013.01); *G01V 1/3808* (2013.01)

(58) Field of Classification Search
CPC ...................................... B63B 21/66
USPC ........................................... 114/244
See application file for complete search history.

(56) References Cited

U.S. PATENT DOCUMENTS

| | | | | |
|---|---|---|---|---|
| 4,222,340 A | * | 9/1980 | Cole | B63B 21/66 114/245 |
| 4,718,871 A | * | 1/1988 | Mendelevitch | B63H 5/165 114/140 |
| 5,042,413 A | * | 8/1991 | Benoit | B63G 7/04 114/221 A |
| 5,241,920 A | * | 9/1993 | Richardson | B63B 21/54 114/221 R |

(Continued)

FOREIGN PATENT DOCUMENTS

EP 0530044 A1 3/1993

OTHER PUBLICATIONS

Written Opinion in related International Application No. PCT/EP2014/058280, dated Aug. 12, 2014.

(Continued)

*Primary Examiner* — Lars A Olson
*Assistant Examiner* — Jovon Hayes
(74) *Attorney, Agent, or Firm* — Patent Portfolio Builders PLLC

(57) ABSTRACT

Device, system and method for protecting towed marine survey equipment from line entanglement are provided. A cutter device has a mounting mechanism configured to fixedly attach at a predetermined position along a cable used for towing, and one or more cutting structures. The cutting structures are attached to and extend away from the mounting mechanism, being configured to cut lines that get caught by the cutting structures or slide along the cable to the predetermined position.

20 Claims, 6 Drawing Sheets

(56) References Cited

U.S. PATENT DOCUMENTS

| | | | | |
|---|---|---|---|---|
| 7,080,607 B2* | 7/2006 | Hillesund | ............... | B63B 21/66 114/244 |
| 7,450,467 B2* | 11/2008 | Tveide | ................... | B63B 21/56 114/245 |
| 7,631,608 B1* | 12/2009 | Lombardi | ............ | B23D 29/002 114/221 A |
| 7,822,552 B2* | 10/2010 | Bittleston | ............ | G01V 1/3826 114/144 A |
| 8,593,905 B2* | 11/2013 | Gagliardi | ................. | G01V 1/38 114/140 |
| 8,792,297 B2* | 7/2014 | Hillesund | ............ | G01V 1/3808 367/16 |
| 9,423,519 B2* | 8/2016 | Hillesund | ............ | G01V 1/3826 |
| 9,482,783 B2* | 11/2016 | Aaker | .................... | G01V 13/00 |
| 2010/0313659 A1* | 12/2010 | Berg | ..................... | G01P 15/093 73/514.26 |
| 2011/0197919 A1* | 8/2011 | Tilley | ...................... | B08B 17/02 134/9 |
| 2013/0098394 A1* | 4/2013 | Fleischer-Pedersen | . | B08B 9/023 134/6 |
| 2016/0096595 A1* | 4/2016 | Larsen | ................. | G01V 1/3808 114/244 |

OTHER PUBLICATIONS

International Search Report in related International Application No. PCT/EP2014/058280, dated Aug. 12, 2014.

* cited by examiner

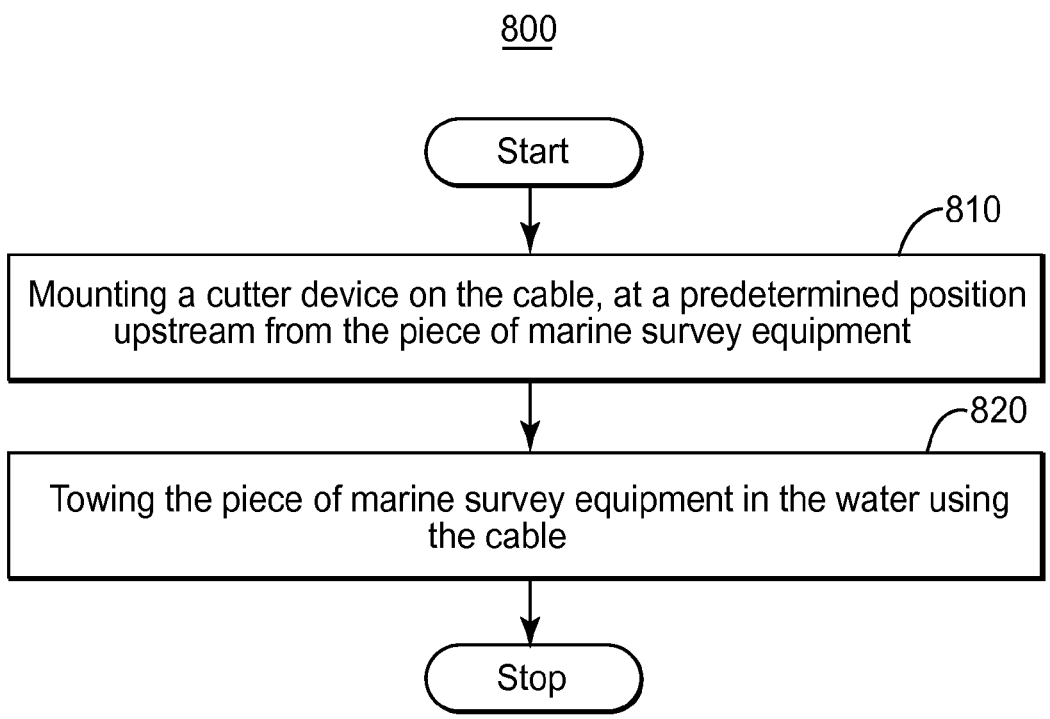

CUTTER DEVICE FOR MARINE SURVEY SYSTEM AND RELATED METHOD

CROSS REFERENCE TO RELATED APPLICATIONS

This application claims priority and benefit from U.S. Provisional Patent Application No. 61/815,751, filed Apr. 25, 2013, for "Fishing Line Cutter," the entire content of which is incorporated in its entirety herein by reference.

BACKGROUND

Technical Field

Embodiments of the subject matter disclosed herein generally relate to protecting a towed marine survey system from damage or malfunction due to lines entangled with survey equipment, or, more specifically, to a cutter device configured to diminish or prevent line entanglements.

Discussion of the Background

During marine surveys (e.g., seismic and/or electromagnetic), various pieces of equipment are towed through water. Some pieces of equipment are directly employed to gather information about an explored structure under the seafloor (e.g., sources configured to generate waves, receivers configured to detect waves reflected by the structure, recorders configured to store data related to the detected waves), while other pieces of equipment are configured to ensure that the former ones are towed and arranged according to a predetermined survey geometry. These other pieces of equipment include cables, steering equipment, deflectors, floaters, etc. For example, a marine survey system may include plural (e.g., twelve) streamers (i.e., cables housing receivers, such as hydrophones) about 10 km long and having about 100 m distance there-between, perpendicular to the towing direction. A customary survey speed is about 5 kts.

While towed through water, the marine survey system may encounter various items floating freely, such as damaged or lost fishing gear, or equipment in use or left to be retrieved, etc. These items frequently have attached lines (i.e., strings, ropes or nets) that may slide along the system's cables until eventually they either get entangled with an obstacle or drift away. The obstacles may be cable-mounted equipment or depth-decreasing end sections of cables. FIG. 1 illustrates, as an example, a streamer steering device 110 (known as a "bird") mounted on a streamer 120 and having spurious lines 130 (only some labeled) entangled thereon.

The entangled lines increase drag, make it difficult to control a cable's shape and relative location within the towed system, lead to cables spinning and twisting, or damage cable sections and the cable-mounted equipment. Removing entangled lines and making repairs that may become necessary due to them are costly in terms of time and personnel.

Accordingly, it is desirable to provide devices and methods that would diminish or prevent line entanglement.

SUMMARY

Cutting devices are configured to be mounted on cables and to catch and cut lines likely to get entangled with cable-mounted survey equipment. The cables may be streamers, and a cutting device may, for example, be mounted in front of each bird, and/or in front of a depth increasing or depth decreasing section.

According to an embodiment, there is a cutter device configured to be mounted on a towed cable. The cutter device includes a mounting mechanism and one or more cutting structures. The mounting mechanism is configured to fixedly attach at a predetermined position along the towed cable. The one or more cutting structures, which are attached to and extending away from the mounting mechanism, are configured to cut lines that get caught by the cutting structures or that slide downstream the towed cable to the predetermined position.

According to another embodiment, there is a marine survey system including one or more streamers attached directly or indirectly to the vessel to tow survey equipment according to a predetermined survey geometry. The marine survey system further includes at least one cutter device mounted on one of the one or more streamers. The at least one cutter device has a mounting mechanism configured to fixedly attach at a predetermined position along the one of the streamers, and one or more cutting structures attached to and extending away from the mounting mechanism, which are configured to cut lines that get caught by the cutting structures or slide along the one of the streamers to the predetermined position.

According to yet another embodiment, there is a method for protecting from line entangling a piece of marine survey equipment. The method includes mounting a cutter device on a cable, at a predetermined position upstream from the piece of marine survey equipment. The method further includes towing the piece of marine survey equipment in the water using the cable. The cutter device includes a mounting mechanism configured to fixedly attach to the cable, and one or more cutting structures attached to and extending away from the mounting mechanism, which are configured to cut lines that get caught by the cutting structures or slide downstream the cable to the predetermined position.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 8 is a flowchart of a method of protecting from line entangling a piece of marine survey equipment towed using a cable, according to an embodiment.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology of a marine survey system. However, similar devices and methods may be used in other situations in which equipment is towed underwater.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

In order to diminish or prevent line entanglement to marine survey equipment, one or more cutter devices are mounted at predetermined positions on cables used to tow the equipment. The term "line" is used in this document to cover at least fishing lines, cords and nets made of twisted or braided strands of hemp, flax, plastic, wire, etc. The term "cable" includes streamers, lead-in cables, cables attaching buoys or deflectors, etc. Embodiments of cutter devices are designed to meet one or more of the following objectives:
- able to cut lines of different thicknesses (e.g., 2-20 mm), covering most lines frequently entangling on marine survey equipment;
- weighing when submerged in seawater no more than 1 kg (seawater's average density being 1027 kg/m$^3$);
- safe for handling during installation, removal and storage;
- easily cleanable and storable;
- configured to provide protection around the cable, e.g., by enabling cutting elements to rotate freely around the cable;
- made of materials resistant to long periods of exposure to seawater, e.g., stainless alloys; and/or
- cutting elements (e.g., blades), which are most prone to damage, easily replaceable.

An additional challenge for cutter devices is the growth of algae and barnacles, which may reduce cutting efficiency.

Figure 1:
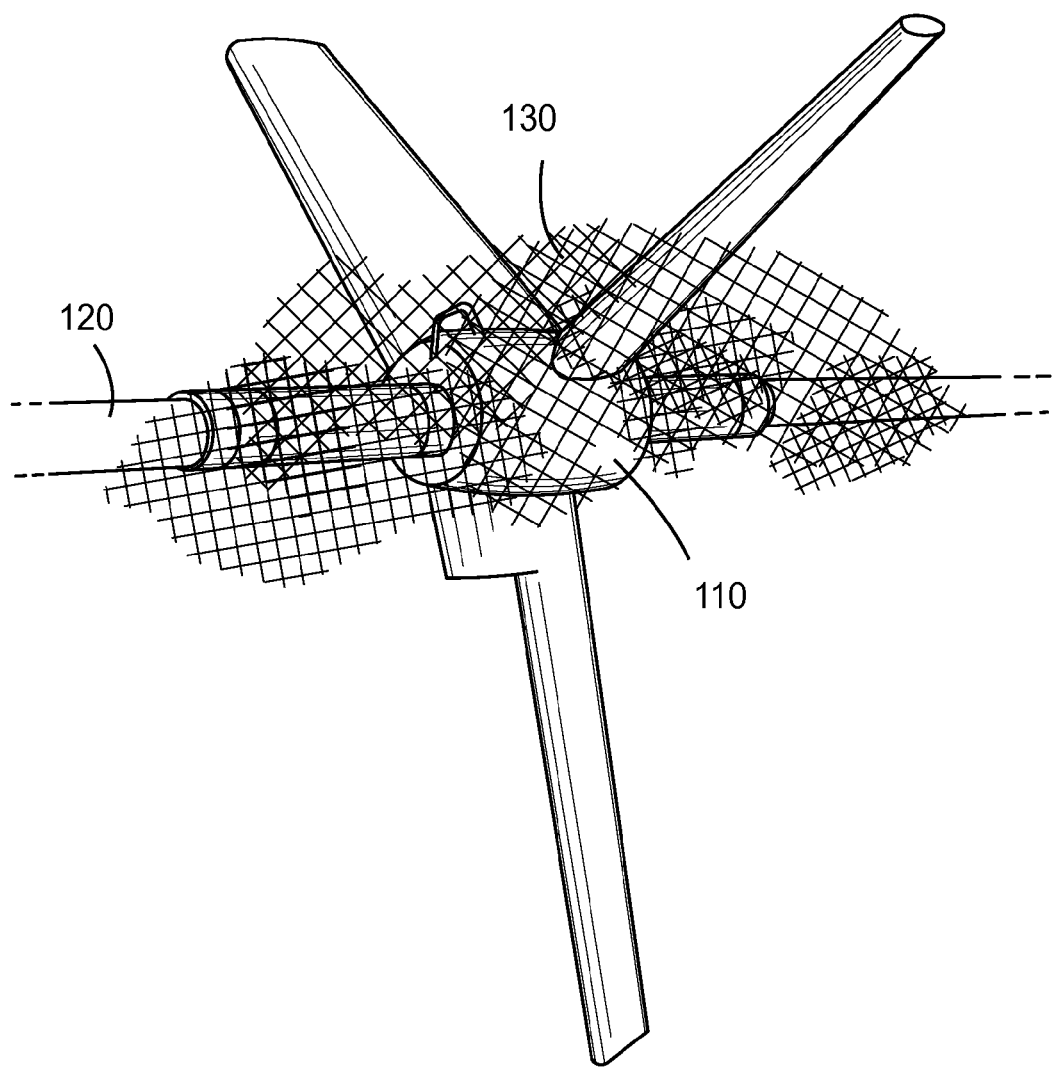
FIG. 1 illustrates a bird with entangled lines.
Figure 2:
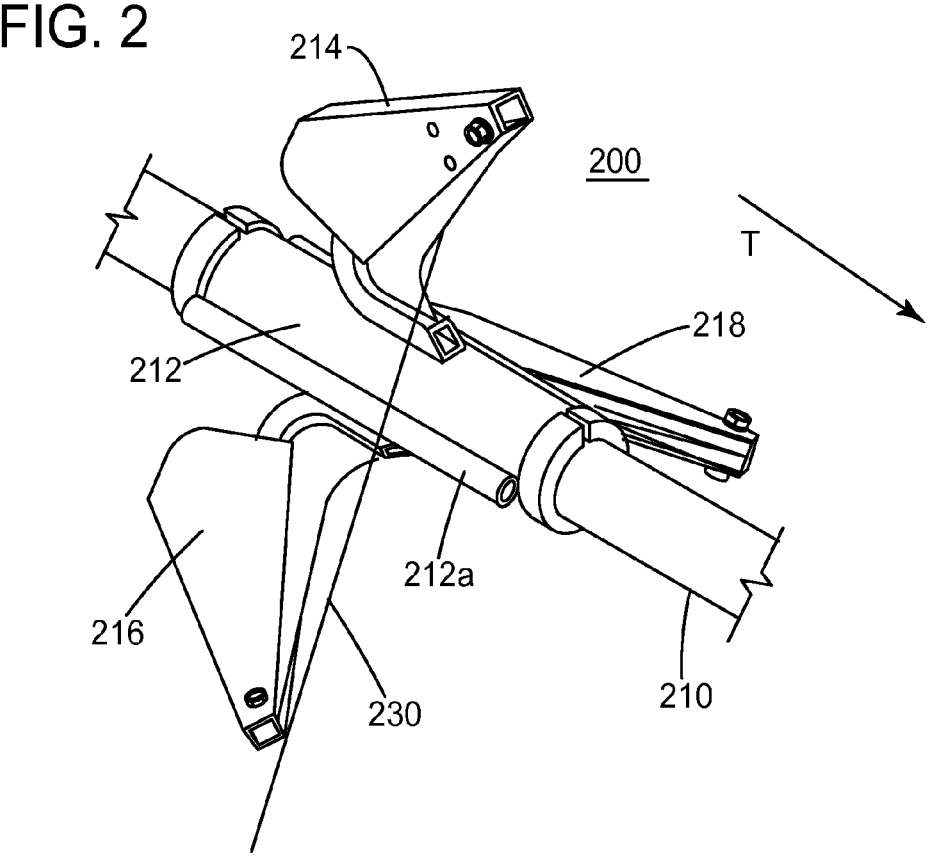
FIG. 2 illustrates a cutter device according to an embodiment.

FIG. 2 illustrates a line cutting device 200 according to an embodiment. Line cutting device 200 is mounted on a cable 210 (e.g., a streamer) towed in direction T. Line cutting device 200 includes a mounting mechanism 212 configured to fixedly attach to the towed cable, and cutting structures 214, 216 and 218 attached to and extending away from mounting mechanism 212. The cutting structures are configured to cut lines such as 230 that get caught by the cutting structures or that slides downstream the towed cable to the line cutting device's location.

Figure 3:
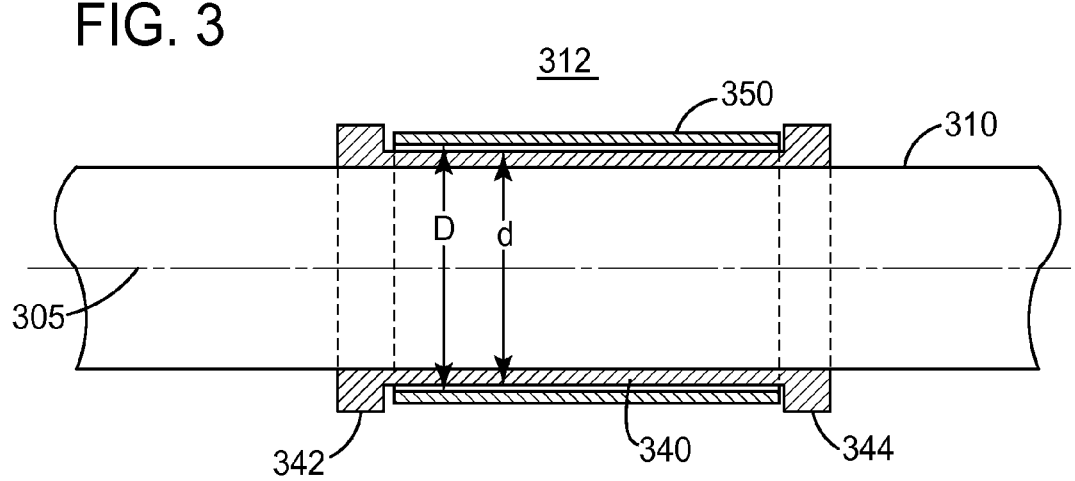
FIG. 3 illustrates a mounting mechanism of a cutter device according to an embodiment.

In some embodiments, the mounting mechanism 312 illustrated in FIG. 3 includes an inner collar 340 and an outer collar 350. Inner collar 340 is configured to have its interior diameter substantially equal to cable 310's diameter so that friction prevents the inner collar from sliding along axis 305. In one embodiment, the inner collar may have two longitudinal parts clamped together to surround the cable, attached to one another with screws (e.g., four screws). In one application, the inner collar may be attached between two sections of the streamer.

Raised (e.g., thicker) end sections 342 and 344 of the inner collar limit outer collar 350's longitudinal motion (i.e., along axis 305). However, since outer collar 350's interior diameter D is larger than inner collar 340's exterior diameter d, outer collar 350 can freely rotate around inner collar 340. If the cutting structures attached to the outer collar can rotate (e.g., when the mounting mechanism has the structure in FIG. 3), line wrapping around the cable 310 becomes less likely, which increases the efficiency of the cutter device and better protects the cable and other equipment.

In one embodiment, the outer collar may have two longitudinal parts hinged (see hinge 212a in FIG. 2) to one another and locked with a pin or a latch (not shown) to surround the middle portion of the inner collar.

Focusing now on the cutting structures, FIG. 2 illustrates three wing-shape cutting structures (214, 216 and 218) extending radially at about 120° from one another around the mounting mechanism. An angle of "about" a certain value (in this case 120°) is intended to have the certain value, i.e., may depart from it only insignificantly. The number of cutting structures (i.e., three) is merely an illustration and is not intended to be a limitation. The angle value of 120° indicates the intent to place the three cutting structures to have equal angles there-between since 3×120°=360°, i.e., a complete circle. In another embodiment, four cutting structures are placed to have equal angles of about 90° there-between since 4×90°=360°. The cutting structures are preferably designed to be substantially flat and oriented so as to add a minimal amount of drag (i.e., their surface perpendicular to the water flow caused by towing is as small as possible).

Figure 4:
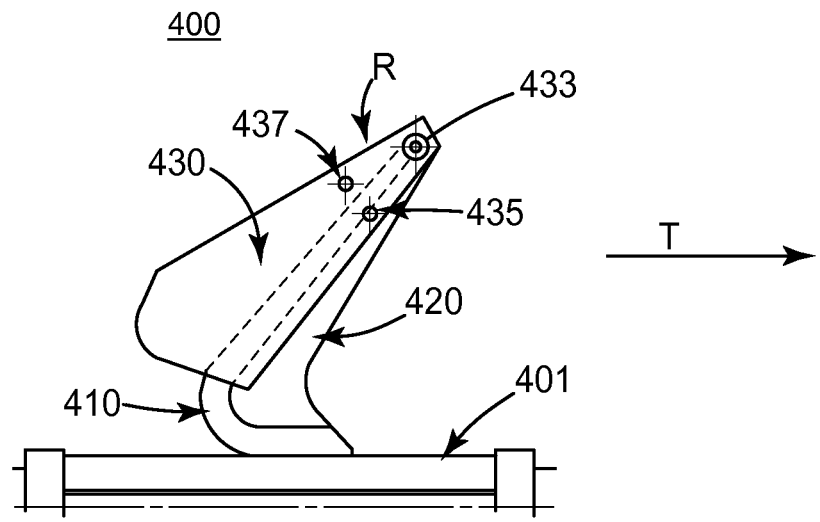
FIG. 4 illustrates a structure of a cutter device in an exposed-blade state, according to an embodiment.

FIG. 4 illustrates a cutting structure 400 according to an embodiment. Cutting structure 400 includes a catcher arm 410, a blade 420 and a protective cover 430. Catcher arm 410 is configured to attach the cutting structure to the mounting mechanism 401, and to provide a support structure for blade 420 and protective cover 430. In some embodiments, the catcher arm and the blade may be a single piece. However, having the catcher arm and the blade as separate pieces has a beneficial effect relative to the ease and safety of handling (i.e., assembling and separating the cutter's parts) and replacement of a damaged blade. Blade 420 may be removably attached to catcher arm 410, for example, with bolts.

Blade 420 is oriented toward an upstream part of the cable, the term "upstream" being defined relative to towing direction T. Blade 420 may be straight, serrated or wavy. In one embodiment, mini-blades making predefined angles with a radial direction may be mounted along the catcher arm instead of or in addition to the blade 420.

Figure 5:
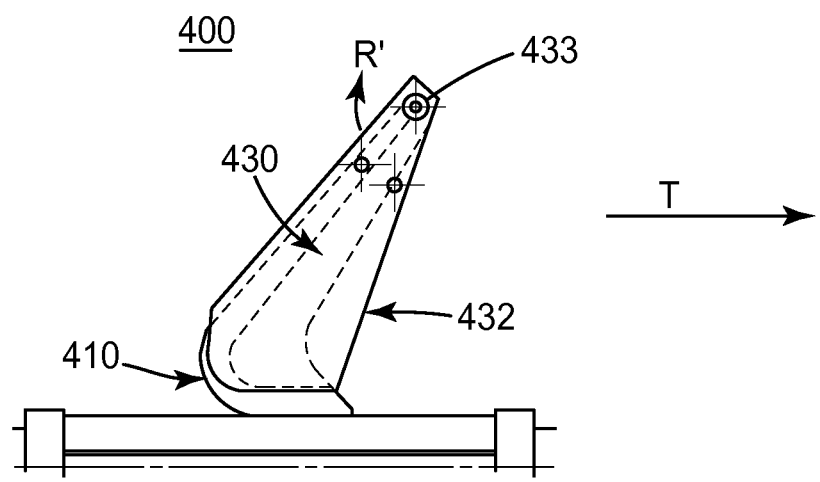
FIG. 5 illustrates the same structure as in FIG. 3 in a covered-blade state.

Protective cover 430 (which is optional) may be elastically biased (e.g., due to a spring not shown) to cover the blade as illustrated in FIG. 5. In the embodiment illustrated in FIGS. 4 and 5, protective cover 430 is configured to rotate around an axis 433 as suggested by arrows R and R'. The cover can rotate within a limited angular range about axis 433, which is located close to the distal end of catcher arm 410. Thus, protective cover 430 is configured to cover blade 420 unless pressure (e.g., due to a line 230 as in FIG. 2) is exerted on the forward side 432 of protective cover 430 to make the cover rotate around axis 433.

Protective cover 430 has a closed-cover hole 435 there-through located such that if a pin is placed through this hole, the cover is locked to cover the blade. Protective cover 430 has an opened-cover hole 437 there-through located such that if a pin is placed through the opened-cover hole, the cover is locked to expose the blade. The protective cover and its additional features are optional but valuable for safe operation and manipulation of the cutter device.

Figure 6:
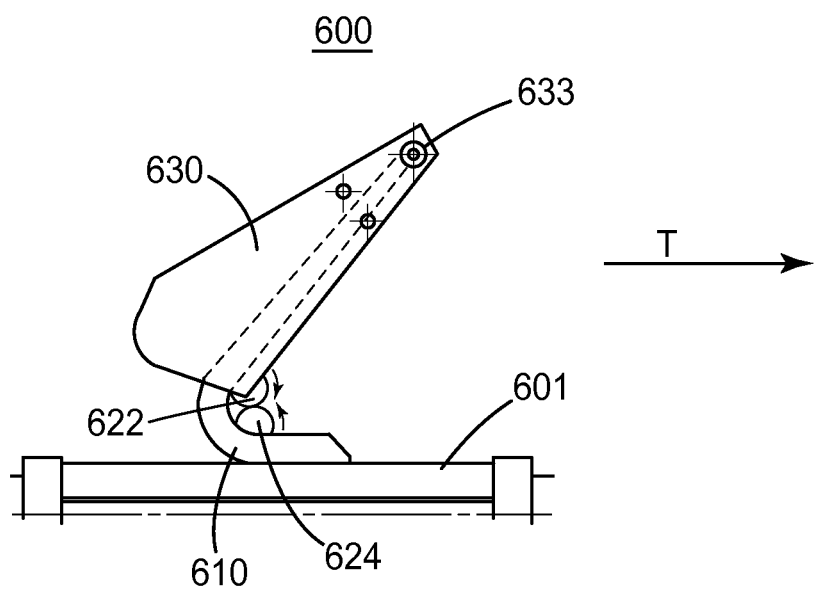
FIG. 6 illustrates a structure of a cutter device in an exposed-blade state, according to another embodiment.

FIG. 6 illustrates a cutting structure 600 according to another embodiment. Cutting structure 600 has a catcher arm 610 and a protective cover 630 similar to corresponding elements of cutting structure 400. Different from cutting structure 400, cutting structure 600 has two circular blades 622 and 624 instead of a longitudinal blade. These circular blades are located close to mounting mechanism 601 and are configured to rotate in opposite directions (as suggested by the arrows in FIG. 6) when a line exerts pressure thereupon.

The mounting mechanism and the one or more cutting structures may be made substantially of stainless metallic alloys (e.g., stainless steel). However, plastic (thermoplastic or polyurethane) may also be used. Seawater-exposed surfaces may be treated with antifouling substances to diminish algae and barnacle growth.

Figure 7:
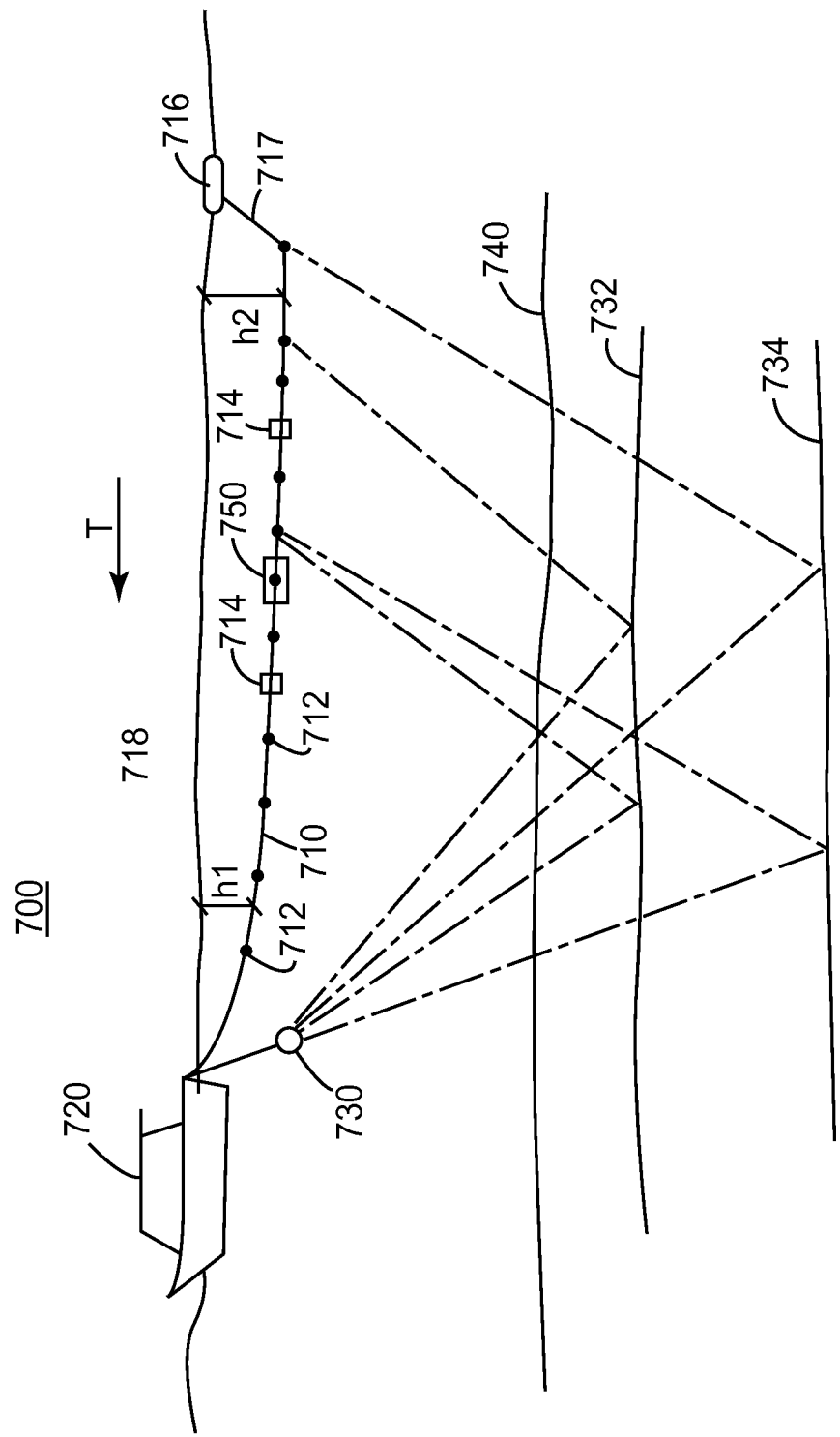
FIG. 7 illustrates a marine survey system according to one embodiment.

Turning now from constructive features of various embodiments of the cutter device to its location in the marine survey system, FIG. 7 partially illustrates a marine seismic survey system 700 according to one embodiment. The system includes a streamer 710 towed by a vessel 720, which may also tow a seismic source 730. Seismic source 730 generates seismic waves reflected by interfaces such as 732 and 734 between layers having different seismic wave propagation speeds under the seafloor 740. The reflected waves are detected by seismic receivers 712 (only a few are labeled) distributed along streamer 710. In addition to the seismic receivers, streamer 710 carries birds 714 configured to maintain the streamer's predetermined depth profile and lateral position (e.g., relative to the vessel and/or other streamers). Streamer 710 is equipped and operated so that the distance from the streamer to the water surface 718 varies along the streamer length (e.g., $h_1 < h_2$ in FIG. 7). For example, the streamer's depth may vary between 7 and 50 m. A cutter device 750 according to any of the previously discussed embodiments is mounted at a predetermined position on streamer 710.

The actual location at which the cutter device is mounted depends on the cable-mounted piece of equipment or on a depth-decreasing end section of one of the cables at which the device is attached. For example, it has been observed that lines often get entangled on birds' wings. If the cutter device is mounted to protect a bird from line entanglement, then its cutting structures may have a span similar to the bird's wing span, which is about 1300 mm for a Nautilus bird (fabricated by Sercel, France). However, such a cutting structure dimension may create a challenge in terms of device storage and handling. Since most of the fishing gear likely moves toward the bird downstream along the streamer, a cutter device with smaller cutting structures (e.g., about 300 mm, but they may be as small as 50-60 mm) placed about 5 m upstream on the streamer relative to the bird's location removes most lines before reaching the bird. These smaller cutting structures are not designed primarily to catch all lines floating towards the cable-mounted equipment, but to pick up and cut lines close to or already in contact with the cable (streamer). Note that the basic shape and functionality does not depend on the cutter device's size.

In another example, it has also been observed that lots of lines get entangled on cable 717 connecting the distal end of streamer 710 to tail buoy 716. One or more cutter devices mounted on cable 717 alleviate this problem. The structure and size of the cutter device may be selected depending on the piece of equipment to be protected from entanglement.

In yet another example, based on the observation that more lines get entangled with the equipment mounted on outer streamers among the towed parallel streamers of a marine survey system than with the equipment mounted on inner streamers thereof, cutter devices may be mounted only or more frequently on the outer streamers than on the inner streamers.

FIG. 8 is a flow diagram of a method 800 of protecting from line entangling a piece of marine survey equipment towed using a cable. Method 800 includes, at 810, mounting a cutter device on the cable, at a predetermined position upstream from the piece of marine survey equipment. The cutter device may be mounted when deploying in water the cable carrying the cutter device and the piece of marine survey equipment. Method 800 also includes, at 820, towing the piece of marine survey equipment in the water using the cable. The cutter device may be removed when the cable is recovered.

The cutter device may be any of the previously discussed embodiments, thus including a mounting mechanism configured to fixedly attach to the cable, and one or more cutting structures (able to rotate around the streamer or not) extending away from the mounting mechanism and configured to cut lines that get caught by the cutting structures or slide downstream the cable to the predetermined position. In some applications, cutting structures that do not rotate may be more efficient in front depth decreasing or depth increasing cable sections.

The disclosed exemplary embodiments provide methods and devices for protecting towed marine survey equipment from spurious line entangling. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A cutter device configured to be mounted on a towed cable, the cutter device comprising:
   a mounting mechanism configured to fixedly attach at a predetermined position along the towed cable; and
   at least three cutting structures, which are attached to and extend in different directions away from the mounting mechanism and are configured to cut lines that get caught by the cutting structures or that slide downstream the towed cable to the predetermined position.

2. The cutter device of claim 1, wherein the towed cable is a streamer.

3. The cutter device of claim 1, wherein the mounting mechanism comprises:
   an inner collar configured to fixedly attach to an outer surface of the towed cable, the inner collar having an upstream and a downstream edge raised away from an outer surface of the towed cable; and
   an outer collar surrounding the inner collar and having a diameter larger than a middle section of the inner collar, but smaller than the upstream and downstream edges of the inner collar so that the outer collar rotates freely around the inner collar.

4. The cutter device of claim 1, wherein the mounting mechanism and the at least three cutting structures are made substantially of stainless metallic alloys.

5. The cutter device of claim 1, wherein the at least three cutting structures extend radially away relative to the mounting mechanism, making about equal angles with one another around the mounting mechanism.

6. The cutter device of claim 1, wherein each of the at least three cutting structures includes a longitudinal blade oriented towards upstream of the cable.

7. The cutter device of claim 6, wherein each of the at least three cutting structures further includes a protective cover configured to cover the blade unless pressure is exerted to rotate the protective cover around an axis located close to a distal end of the cutting structure, to expose the blade.

8. The cutter device of claim 7, wherein the protective cover has a closed-cover hole there-through located such that if a pin is placed through the closed-cover hole, the protective cover is locked to cover the blade.

9. The cutter device of claim 7, wherein the protective cover has an opened-cover hole there-through located such that if a pin is placed through the opened-cover hole, the protective cover is locked to expose the blade.

10. The cutter device of claim 1, wherein each of the at least three cutting structures has two circular blades located close to the mounting mechanism and configured to rotate in opposite directions when a line exerts pressure thereon.

11. The cutter device of claim 1, wherein the cutter device has three cutting structures that are substantially flat and extend radially away from a longitudinal axis of the device, having angles of about 120° with one another.

12. A marine survey system, comprising:
one or more streamers attached directly or indirectly to the vessel to tow survey equipment according to a predetermined survey geometry; and
at least one cutter device mounted on one of the one or more streamers, the at least one cutter device including
a mounting mechanism configured to fixedly attach at a predetermined position along the one of the streamers; and
at least three cutting structures attached to and extending in different directions away from the mounting mechanism, the cutting structures being configured to cut lines that get caught by the cutting structures or slide along the one of the streamers to the predetermined position.

13. The marine survey system of claim 12, wherein plural cutter devices are attached to the one or more streamers at predetermined positions upstream of cable-mounted pieces of survey equipment and/or determined based on the predetermined survey geometry.

14. The marine survey system of claim 12, wherein the cutter device is mounted at a predetermined distance upstream to a streamer-mounted piece of equipment or on a depth-decreasing end section of the one of the streamers.

15. The marine survey system of claim 12, wherein the mounting mechanism comprises:
an inner collar configured to fixedly attach to an outer surface of the one of the streamers, the inner collar having an upstream and a downstream edge raised away from an outer surface of the one of the streamers; and
an outer collar surrounding the inner collar and having a diameter larger than a middle section of the inner collar, but smaller than the upstream and downstream edges of the inner collar so that the outer collar rotates freely around the inner collar.

16. The marine survey system of claim 12, wherein the at least three cutting structures extend radially away relative to the mounting mechanism, making about equal angles with one another around the mounting mechanism.

17. The marine survey system of claim 12, wherein each of the at least three cutting structures includes a blade oriented towards upstream of the cable and/or two circular blades located close to the mounting mechanism and configured to rotate in opposite directions when a line exerts pressure thereon.

18. The marine survey system of claim 17, wherein each of the cutting structures further includes a protective cover configured to cover the blade and/or the two circular blades unless pressure is exerted to rotate the protective cover around an axis located close to a distal end of the cutting structure, to expose the blade and/or the two circular blades.

19. The marine survey system of claim 18, wherein the protective cover has
a closed-cover hole there-through located such that if a pin is placed through the closed-cover hole, the protective cover is locked to cover the blade, and/or
an opened-cover hole there-through located such that if a pin is placed through the opened-cover hole, the protective cover is locked to expose the blade.

20. A method for protecting from line entangling a piece of marine survey equipment, the method comprising:
mounting a cutter device on a cable, at a predetermined position upstream from the piece of marine survey equipment; and
towing the piece of marine survey equipment in the water using the cable,
wherein the cutter device includes a mounting mechanism configured to fixedly attach to the cable, and at least three cutting structures attached to and extending in different directions away from the mounting mechanism, which are configured to cut lines that get caught by the cutting structures or slide downstream the cable to the predetermined position.

* * * * *